Sept. 10, 1935.    K. E. BARRETT    2,014,270
HEALTH SCALE
Filed Aug. 3, 1931    4 Sheets-Sheet 4

INVENTOR
KARL E. BARRETT
BY
Franklin S. Bisbee
ATTORNEY

Patented Sept. 10, 1935

2,014,270

UNITED STATES PATENT OFFICE 2,014,270

HEALTH SCALE

Karl E. Barrett, Sherbrooke, Quebec, Canada, assignor to E. and T. Fairbanks and Company, St. Johnsbury, Vt., a corporation of Vermont Application August 3, 1931, Serial No. 554,783

5 Claims. (Cl. 265—68)

My invention relates to improvements in health scales, particularly to that type of scale in which the operative mechanism is mounted and suspended entirely as a unit within the casing.

In health scales in general use it has generally been the practice to mount the movable parts of the scale mechanism either on the walls of the casing or on the base of the scale with certain operating parts extending through the upper plate or top of the scale to the dial. According to this method the parts are necessarily assembled separately and not as a unit, so that since the parts are independently mounted, it is usually necessary in order to make adjustments or to facilitate the making of repairs, to disconnect some of the parts from the casing walls, the base and the dial. It is the purpose of my invention to overcome these disadvantages and provide means that will enable the scale mechanism to be readily assembled and unassembled when desired, as well as to render it accessible. Therefore, one of the important objects of the invention is to provide a frame unit for assembling and carrying thereon the entire weighing and operating mechanism of the scale.

Another object is to provide means for suspending the unit entirely from the top plate of the scale casing, thereby rendering the entire operating mechanism readily accessible.

Another object is to provide means integral with the unit for operating and carrying the dial pointer or indicator.

Another object is to mount the scale platform on spiral springs disposed in a vertical frame attached to the assembling unit and provided with co-operating means for actuating the dial indicator.

Another object is to provide each spiral spring with a sealing ring for adjusting the tension of the spring.

In order that the nature of my invention may be fully understood, I have illustrated certain embodiments of the invention in the accompanying drawings, in which,—

Figure 1:
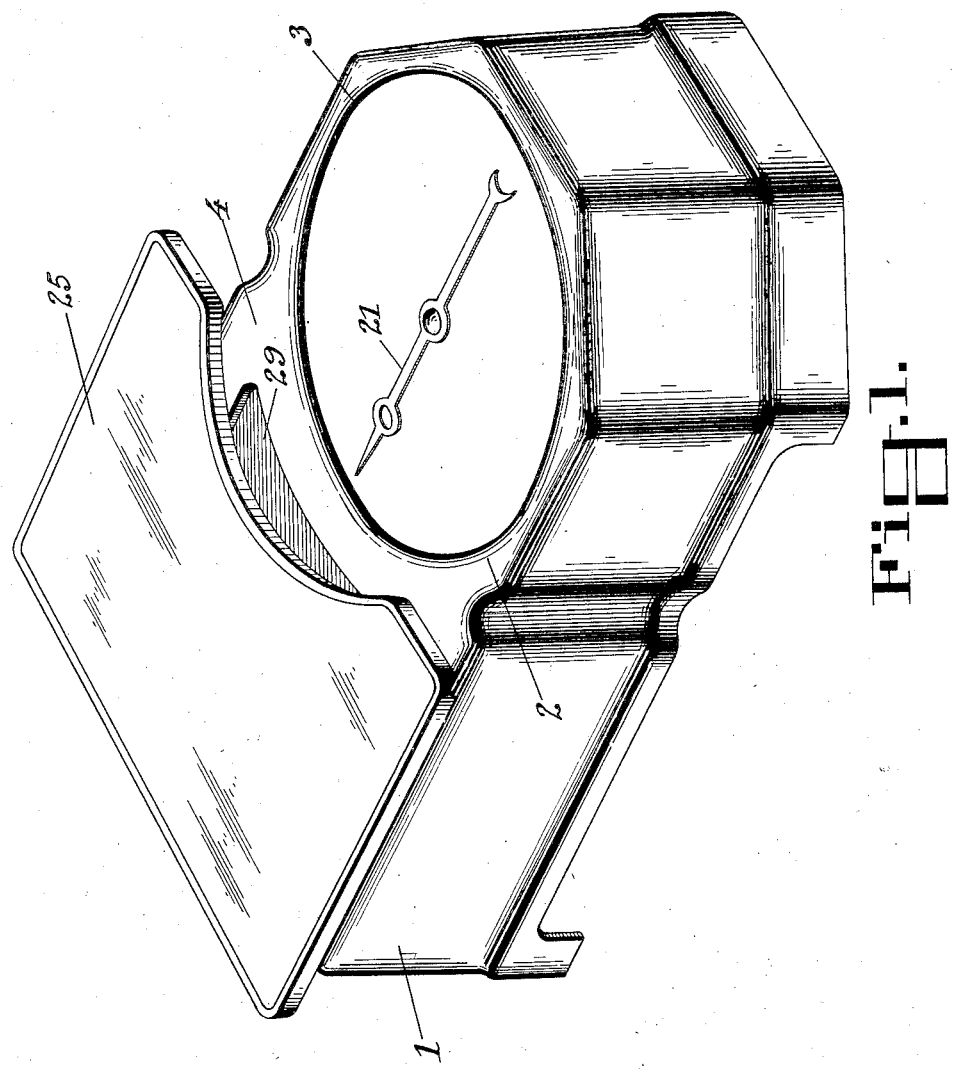
Figure 1 is an isometric view of the scale.
Figure 2:
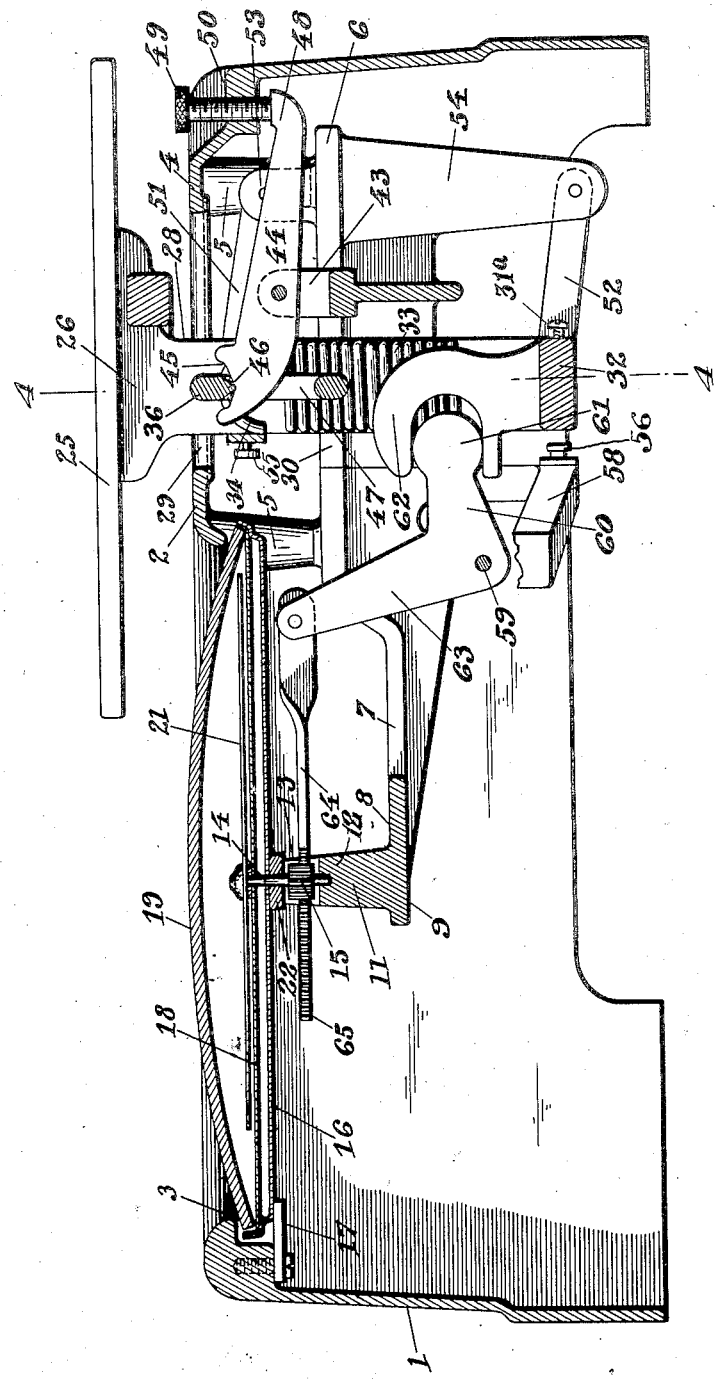
Figure 2 is a longitudinal section of the scale, showing the operating and weighing mechanism unit in its suspended position and embodying a preferred form of my invention.
Figure 3:
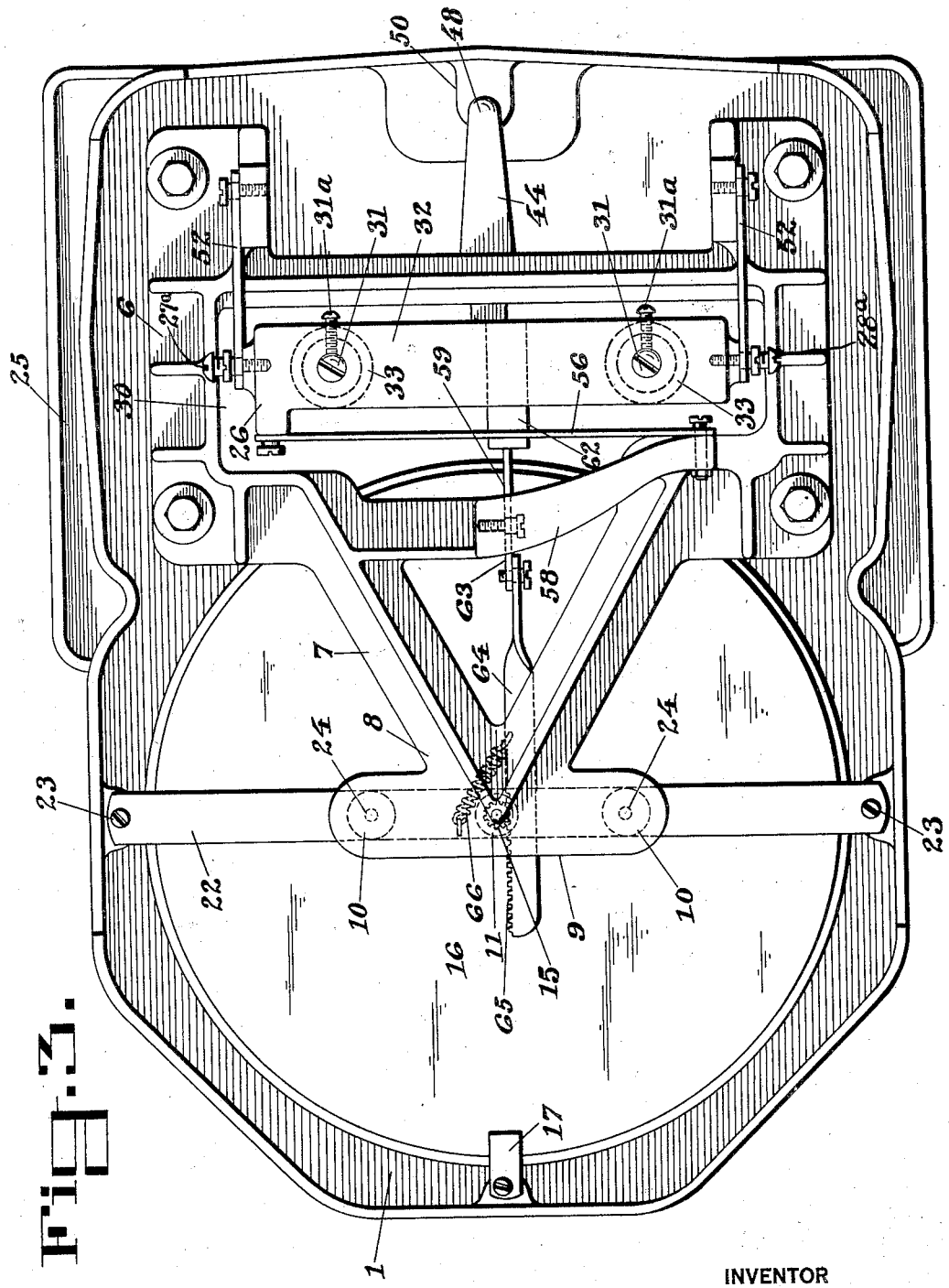
Figure 3 is a bottom plan view of the parts shown in Figure 1.
Figure 4:
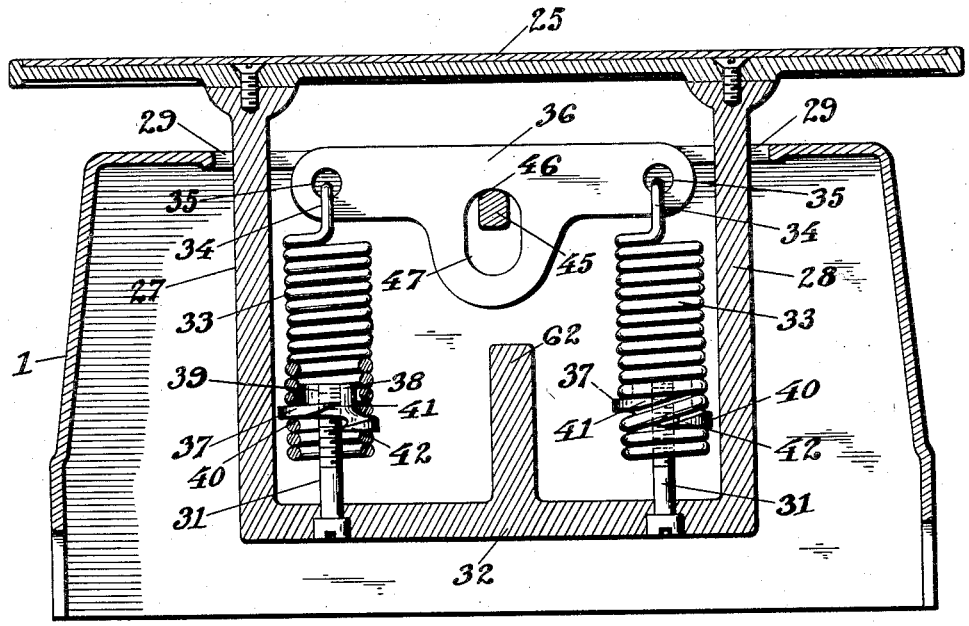
Figure 4 is a cross-section on the line 4—4 of Fig. 2 showing especially the platform and the spiral springs, on which the platform is mounted, together with the cooperating check levers, but omitting the main frame unit.

In the drawings 1 designates the scale casing, the upper plate 2 of which is provided with a circular dial opening 3 and a mounting portion 4 for the scale mechanism.

Depending from the upper plate 4 are a plurality of spaced bosses 5, on which is fastened a main frame unit 6 adapted to serve as an assembling unit for the entire operating mechanism.

The main frame 6 is provided with an integral, laterally extending triangular bracket 7 having at its peak 8 a cross plate 9, on which are upwardly extending spaced bosses 10 and 11, the center boss 11 being provided at its top 12 with an opening 13, through which extends a vertical pivot pin 14 carrying a pinion 15 and mounted in the boss 11. On the top 12 is horizontally mounted a circular dial holder 16, supported by a detachable arm 17 secured to the casing 1, in which dial holder 16 is disposed a suitable dial 18 covered by a convex or crowned dial glass 19, the whole being mounted in the dial opening 3. Within the dial holder 16 and co-operating with graduations 20 on the face of the dial 18 is an indicator or pointer 21, which is mounted on the pivot pin 14. Extending transversely of the dial holder 16 and mounted on the spaced bosses 10 is a flat bar 22, secured by bolts 23 to the rim of the dial opening 3, and to which the dial holder 16 and the dial 18 are fastened by bolts 24 passing through coinciding openings therein and an opening in the upper end of each boss 10, whereby the dial holder 16 and dial 18 are held securely in position on the main frame 6.

The platform 25 is mounted on a U-shaped, movable platform frame 26, the upstanding arms 27 and 28 of which are fastened to the under side of the platform. The platform frame 26 is vertically mounted in the main frame 6 passing through a rectangular opening 29 in the upper casing plate 4 and a rectangular opening 30 in the main frame 6. Mounted on spaced adjustable bolts 31 on the base plate 32 of the platform frame 26 provided with set screws 31a are vertically disposed spiral springs 33 having their upper ends 34 inserted in openings 35 at the ends of a horizontally disposed yoke 36.

Figures 5, 6:
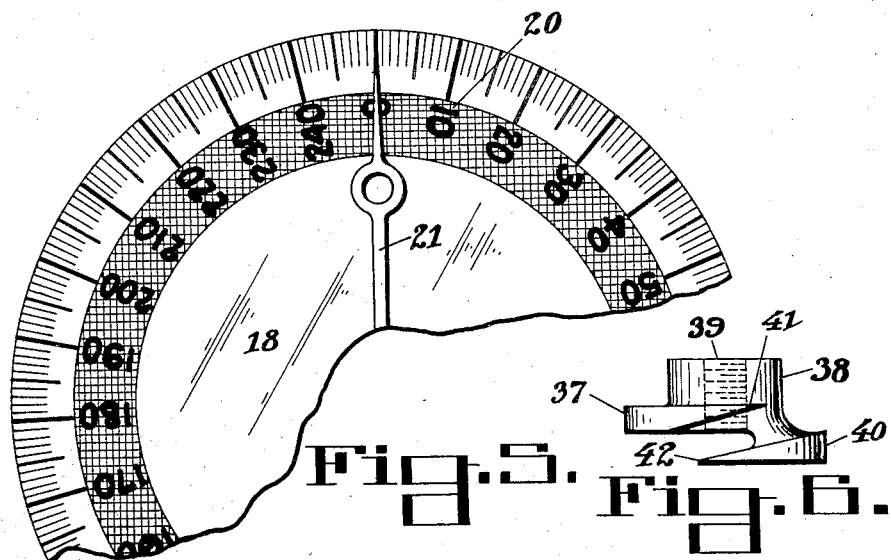
Figure 5 is a plan of a portion of the dial showing the graduations and numerals.
Figure 6 is a vertical elevation of the sealing ring.

Inserted in each spiral spring 33 is a sealing ring 37 (Fig. 6) having a tubular center portion 38 provided with a threaded opening 39, in which the threaded upper end of the pin 31 is adapted to enter. The sealing ring 37 is provided also with a split flange 40 having a beveled guide portion 41 and a downward beveled pointed guide portion 42 adapted to enter and pass between adjacent spirals, whereby under control of the movable pin 31 the sealing ring 37 may be turned and adjusted to the proper position in order to equalize the tension of the spiral springs 33.

Pivotally mounted in a boss 43 on the main frame 6 is an adjustable tension arm 44 provided at its inner end with a concaved arcuate portion 45, adapted to engage the knife edge bearing rim 46 of an opening 47 in the center of the yoke 36 and having its upturned outer end 48 in engagement with an adjusting thumb screw 49 inserted in a recessed portion 50 formed in the casing 1. By adjusting the thumb screw 49, the tension of the springs 33 and consequently the position of the pointer 21 with relation to the zero graduation on the dial may be varied as may be necessary to bring the pointer to the zero graduation.

Check screws 27a and 28a serve to limit the upward movement of the platform frame 26 by engaging the lower portion of the main frame 6, in case the scale should be lifted by the platform 25.

In order to prevent rocking of the platform 25 and to guide and maintain the movable platform 26 in its vertical movement two pairs of spaced check or guide links 51 and 52 are mounted at each end of the platform frame 26, one end of each upper link 51 being pivoted to a boss 53 on the main frame 6 and the other end to the co-operating arm 27 or 28 respectively of the platform frame 26, while one end of each lower link 52 is pivoted to a boss 54 depending from the main frame 6 and the other end to one side of the base plate 32 of the platform frame 26. Likewise a spaced pair of check links 55 and 56 are disposed longitudinally of the inner side of the platform frame 26, the upper link 55 having one end pivoted on the upper end of the arm 28 of the frame 26 and the other end pivoted to a laterally extending boss on the main frame 6, while one end of the lower link 56 is pivoted on the base plate 32 and the other end is pivoted on a curved cross bar 58 integral with the main frame 6.

Therefore, by this arrangement the opposed guide links 51, 52 and 55, 56 serve to automatically compensate for any unequal load stresses and to constantly guide and maintain the platform frame 26 and the platform 25 in a perpendicular position.

Pivotally mounted on the curved cross bar 58, which is integral with the main frame 6 and disposed at right angles to the cross plate 9, is a bell crank lever 59 having at the end of its lower arm 60 a circular portion 61 adapted to freely engage and co-operate with a hooked member 62 centrally disposed in the base plate 32 of the platform frame 26 and integral therewith. The upper arm 63 of the bell crank lever 59 is pivotally connected at its free end to a horizontal bar 64 provided on one edge with a toothed rack 65 adapted to engage the pinion 15 and thereby move the pointer 21, when the bar 64 is moved, while a spiral spring 66 serves to hold the toothed rack 65 in engagement with the pinion 15.

By this arrangement the load on the platform causes the platform to press down upon and to actuate the platform frame 26 carrying with it the vertical spiral springs 33 under tension by reason of their fixed attachment to the yoke 36, the tension varying in proportion to the load. As the platform frame 26 descends the hooked member 62 rocks the bell crank lever 59, thereby moving the bar 64 and turning the pinion 15 and with it the pointer 21 to the proper graduation 20 on the dial 18 to indicate the weight of the load. The scale is adjusted by wedging the sealing ring 37 at the proper point in each spiral spring 33, as previously described.

It is evident, therefore, from the foregoing that the entire operating mechanism of the scale is not only carried by the main frame 6, but the main frame is suspended entirely from the top of the casing. These novel features enable the movable parts of the operating mechanism to be more readily, accessibly, and efficiently mounted, than would be the case in similar scales in general use, in which these movable parts are often secured to the walls or base of the casing. Moreover, the suspension of the entire operating mechanism renders it perfectly accessible for adjustment or repair without the necessity of removing the casing or detaching any of the operating parts therefrom while this arrangement permits lighter construction by dispensing with a relatively heavy base and casing.

While I have shown a preferred embodiment of my invention it is evident that modifications of the invention may be made that will come within the scope of the invention and I do not desire, therefore, to be limited to the exact form of construction shown and described herein.

I claim:—

1. In a weighing scale, the combination with a casing, of a platform mounted on a movable platform frame, adjusting bolts carried by the said platform frame, spaced spiral springs mounted on the said adjusting bolts, a main frame unit depending from the top of the said casing, within which the platform frame is disposed and adapted to carry the entire weighing mechanism, and a yoke provided with a central opening having its upper edge beveled, forming thereby a knife edge bearing, and having an opening at each end in which the upper end of one of the said spiral springs is inserted and a pivotally mounted tension arm having an arcuate end portion adapted to engage and co-operate with the said knife edge bearing.

2. In a weighing scale, the combination with a casing, of a platform mounted on a movable platform frame, adjusting bolts carried by the said platform frame, spaced spiral springs mounted on the said adjusting bolts, a main frame unit depending from the top of the said casing, within which the platform frame is disposed and adapted to carry the entire weighing mechanism, a yoke provided with a central opening having its upper edge beveled, forming thereby a knife edge bearing, and having an opening at each end in which the upper end of one of the said spiral springs is inserted, a pivotally mounted tension arm attached to the frame unit and provided at its inner end with a concaved arcuate portion adapted to engage the said knife edge bearing, an upturned outer end on the said tension arm disposed in engagement with an adjusting screw, whereby the tension of both spiral springs may be simultaneously adjusted and consequently the position of the said indicator varied and adjusted.

3. In a weighing scale, the combination with a casing, of a platform mounted on a movable platform frame, adjusting bolts carried by the said platform frame, spaced spiral springs mounted on the said adjusting bolts, a main frame unit depending from the top of the said casing, within which the platform frame is disposed and adapted to carry the entire weighing mechanism, a pivotally mounted yoke disposed in the said platform frame and having the upper end of each spiral spring connected thereto, and a sealing ring inserted in each spiral spring adapted to adjust the tension of the said spring, comprising a tubular center portion having its opening threaded to receive one of the said threaded adjusting bolts and provided with a split flange having an upwardly beveled guide portion and a downwardly extending beveled guide portion, each adapted to pass between adjacent spirals of the spring and under control of the said respective adjusting bolts and to be turned to the proper position.

4. In a weighing scale, the combination with a casing, of a movable platform frame supporting a platform, a detachably mounted main frame unit depending from the top of the said casing within which the platform frame is disposed and adapted to carry the said movable platform frame, platform and the entire weighing mechanism, an extension bracket integral with the said main frame unit and carrying a dial and operating mechanism for an indicator co-operating with the said dial, a pivotally mounted intermediate bell crank lever disposed between the indicator operating mechanism and the platform frame and provided with an upwardly extending upper arm and having at the end of its lower arm a circular portion, and a hooked end operating member located in the base plate of the platform frame, integral therewith and interfitting and co-acting with the circular portion of the lower arm of the said bell crank lever in causing the said lever under influence of the load to operate the dial indicator.

5. In a weighing scale, the combination with a casing, a platform mounted therein on a movable platform frame, a main frame unit depending from the top of the said casing, within which the platform frame is disposed and adapted to carry the entire weighing mechanism, a cross bar carried by the said main frame unit, and means for preventing rocking of the platform as well as for guiding the said platform frame, comprising pivotally mounted, spaced side check links connected respectively to the upper ends of the side arms of the platform frame and its base plate, and to the main frame unit, as well as longitudinally spaced check links pivotally attached respectively to the upper end of one of the side arms of the platform frame and the lower longitudinal check link to one end of the base plate of the U-shaped platform frame and the cross bar of the main frame unit.

KARL E. BARRETT.